(12) United States Patent
Wang et al.

(10) Patent No.: US 8,055,137 B2
(45) Date of Patent: Nov. 8, 2011

(54) PHASE CODED NON-RETURN-TO-ZERO OPTICAL TRANSMITTER

(76) Inventors: Tongqing Wang, La Canada Flintridge, CA (US); Jinghui Li, Arcadia, CA (US)

( * ) Notice: Subject to any disclaimer, the term of this patent is extended or adjusted under 35 U.S.C. 154(b) by 856 days.

(21) Appl. No.: 12/079,458

(22) Filed: Mar. 26, 2008

(65) Prior Publication Data

US 2008/0240726 A1 Oct. 2, 2008

Related U.S. Application Data

(60) Provisional application No. 60/920,167, filed on Mar. 27, 2007.

(51) Int. Cl.
*H04B 10/04* (2006.01)

(52) U.S. Cl. ........ 398/185; 398/186; 398/188; 398/191; 398/141

(58) Field of Classification Search .................. 398/141, 398/183, 185–189, 191, 140, 202
See application file for complete search history.

(56) References Cited

U.S. PATENT DOCUMENTS

| | | | | |
|---|---|---|---|---|
| 5,473,636 A * | 12/1995 | Rokugawa | ..................... | 375/324 |
| 5,543,952 A * | 8/1996 | Yonenaga et al. | ............ | 398/185 |
| 6,097,525 A * | 8/2000 | Ono et al. | ..................... | 398/185 |
| 6,915,081 B2 * | 7/2005 | Takeshita et al. | ............. | 398/188 |
| 6,963,697 B2 * | 11/2005 | Gurusami et al. | ............ | 398/202 |
| 7,200,343 B2 * | 4/2007 | Ikeuchi | .......................... | 398/198 |
| 7,349,636 B2 * | 3/2008 | Zitelli | ........................... | 398/185 |
| 7,398,022 B2 * | 7/2008 | Zitelli | ............................ | 398/183 |
| 7,831,005 B2 * | 11/2010 | Kuwata | ........................ | 375/371 |
| 2004/0190910 A1 * | 9/2004 | Akiyama et al. | ............... | 398/186 |
| 2005/0041983 A1 * | 2/2005 | Bissessur | ...................... | 398/186 |
| 2007/0206960 A1 * | 9/2007 | Nissov et al. | ................. | 398/188 |
| 2008/0112507 A1 * | 5/2008 | Smith et al. | .................. | 375/308 |

* cited by examiner

*Primary Examiner* — Kenneth N Vanderpuye
*Assistant Examiner* — Hibret Woldekidan

(57) ABSTRACT

Embodiments of the present invention provide a method and apparatus for producing a phase coded non-return-to-zero (PC-NRZ) optical signal. The method includes providing an input optical signal; providing first and second drive signals, the first drive signal having a first data pattern of first and second signal levels, the second drive signal having a second data pattern, the second data pattern having third and fourth signal levels that toggle at least when the first drive signal changes from the first signal level to the second signal level; and modulating amplitude of the input optical signal with the first drive signal and modulating phase of the input optical signal with the second drive signal to produce the PC-NRZ optical signal. A PC-NRZ optical transmitter and an optical transmission system applying the PC-NRZ optical transmitter are also provided.

12 Claims, 4 Drawing Sheets

PHASE CODED NON-RETURN-TO-ZERO OPTICAL TRANSMITTER

CROSS REFERENCE TO RELATED APPLICATION

The present application claims priority of a provisional patent application Ser. No. 60/920,167, filed Mar. 27, 2007 in the United States Patent and Trademark Office, entitled "Phase Coded NRZ Optical Transmitter", the content of which is incorporated herein by reference in its entirety.

FIELD OF THE INVENTION

The present invention relates to high-speed optical signal transmission. In particular, it relates to optical signal modulation schemes that enhance the quality of signal transmission over extended distance in a dispersive medium.

BACKGROUND OF THE INVENTION

In optical data communication, generally an optical transmitter or transmitting module launches a modulated optical signal into an optical transmission media such as, for example, an optical fiber. The optical signal propagates through the transmission media, experiences various sources of noises and/or waveform distortions, and eventually may be received by an optical receiver. The received optical signal may be subsequently converted into an electrical signal, which carries data information intended for the communication and shall be the same, at least in theory, as that used in modulating the optical signal at the transmitting module.

As is well known in the art, one of the most commonly used modulation scheme in current optical communication is amplitude modulation in a non-return-to-zero (NRZ) format. The NRZ modulation generally has two optical signal levels or signal power levels: a high power level of "1" (or "mark") and a low power level of "0" (or "non-mark"). An extinction ratio, which may be defined as the power ratio of "1" over "0", may be used to characterize, among other measures, the quality of a modulated optical signal. Other measures or criteria characterizing a modulated optical signal may include, for example, signal-to-noise ratio (SNR), and waveform distortion characterized typically by, for example, an eye diagram.

As the rate of data transmission increases, the optical signal may suffer more severely from one particular characteristic of the transmission media, that is, dispersion. Dispersion of the optical transmission media, for example fibers including conventional fibers (SMF-28) and dispersion shifted fibers, causes degradation of optical signal quality in ways of distorting the signal waveform, resulting in partially and in some severe situations complete closure of the eye diagram. Although various dispersion compensation techniques have been proposed and in some cases implemented to mitigate the impact of the dispersive transmission media, more needs to be done in order to improve the quality of optical signal transmission, and in particular, optical signal transmission over an extended distance.

SUMMARY OF THE INVENTION

Embodiments of the present invention provide a method of producing a phase coded non-return-to-zero (PC-NRZ) optical signal. The method includes providing an input optical signal; providing first and second drive signals, the first drive signal having a first data pattern of first and second signal levels, the second drive signal having a second data pattern, the second data pattern having third and fourth signal levels that toggle at least when the first drive signal changes from the first signal level to the second signal level; and modulating amplitude of the input optical signal with the first drive signal and modulating phase of the input optical signal with the second drive signal to produce the PC-NRZ optical signal.

Embodiments of the method, according to the present invention, also include causing a delay between the first and second drive signals, before being applied in modulating the amplitude and phase of the input optical signal, such that the toggling between the third and fourth signal levels of the second drive signal happens at a time substantially close to half of the bit period behind corresponding change of the first drive signal from the first signal level to the second signal level.

Embodiments of the method, according to the present invention, further include adjusting the third and fourth signal levels of the second drive signal and thus creating a phase difference of substantially close to 180 degrees in portions of a single bit, of the PC-NRZ optical signal, relating to modulations caused by the third and fourth signal levels of the second drive signal.

According to one embodiment, the PC-NRZ optical signal has first and second optical signal levels, and embodiments of the method include adjusting the first and second signal levels of the first drive signal and achieving a predetermined extinction ratio between the first and second optical signal levels, wherein the second optical signal level corresponds to the second signal level of the first drive signal, and is smaller than the first optical signal level.

In achieving the predetermined extinction ratio, embodiments of the method include using a filter to reshape the first and second drive signals before applying the first and second drive signals in modulating the amplitude and phase of the input optical signal.

According to one embodiment, providing first and second drive signals includes applying a digital data signal to a data input port of a first digital flip-flop and thus producing the first drive signal at a normal output port of the first digital flip-flop; and applying an inverted output from the first digital flip-flop to a clock input port of a second digital flip-flop and thus producing the second drive signal at a normal output port of the second digital flip-flop, wherein an inverted output port of the second digital flip-flop is connected to a data input port of the second digital flip-flop.

Embodiments of the method also include toggling the third and fourth signal levels of the second drive signal when the first drive signal changes from the first signal level to the second signal level as well as when the first drive signal stays at the second signal level from a previous bit.

According to one embodiment, providing first and second drive signals include applying a digital data signal to a data input port of a first digital flip-flop and thus producing the first drive signal at a normal output port of the first digital flip-flop; applying an inverted output from the first digital flip-flop to an inverter and a first NAND logic gate with an output from the inverter being connected to a second NAND logic gate; outputs from the first and second NAND logic gates being connected to a third NAND logic gate; and applying an output from the third NAND logic gate to a data input port of a second digital flip-flop and thus producing the second drive signal at a normal output port of the second digital flip-flop, wherein an inverted output port of the second digital flip-flop is connected to the first NAND logic gate.

Embodiments of the present invention provide an optical transmitter or transmitting module. The transmitter includes an optical signal source; a modulation module connected to the optical signal source with the modulation module, including at least an amplitude modulator and a phase modulator, being applied to an input optical signal coming from the optical signal source; and an electrical circuit. The electrical circuit has first and second electrical connections to the amplitude modulator and the phase modulator, respectively, of the modulation module. The first electrical connection provides a first drive signal that has a first data pattern of first and second signal levels; the second electrical connection provides a second drive signal that has a second data pattern, the second data pattern having third and fourth signal levels that toggle at least when the first drive signal changes from the first signal level to the second signal level.

According to one embodiment, the first and second data patterns have a predetermined bit period, and the electrical circuit provides the first and second drive signals, the second drive signal being delayed relative to the first drive signal such that the toggling between the third and fourth signal levels of the second drive signal occurs at a time substantially close to half of the bit period behind corresponding change of the first drive signal from the first signal level to the second signal level.

According to another embodiment, the third and fourth signal levels of the second drive signal modulates a phase of the input optical signal to produce a phase coded optical signal, the phase coded optical signal having a phase difference of substantially close to 180 degrees in portions of a single bit corresponding to the third and fourth signal levels of the second drive signal.

According to yet another embodiment, the electrical circuit includes a signal coding block, the signal coding block having first and second digital flip-flops, the first digital flip-flop having an inverted output connected to a clock input of the second digital flip-flop, respective normal outputs of the first and second digital flip-flops produce the first and second drive signals.

According to one embodiment, the electrical circuit includes a signal coding block, the signal coding block having first and second digital flip-flops; the first digital flip-flop having an inverted output connected to an inverter and a first NAND logic gate; an output from the inverter being connected to a second NAND logic gate; outputs from the first and second NAND logic gates being connected to a third NAND logic gate; an output from the third NAND logic gate being connected to an data input of the second digital flip-flop; and an inverted output of the second digital flip-flop is connected to the first NAND logic gate.

According to one embodiment, the electric circuit is adapted to provide the second drive signal, output of the second drive signal toggling between the third and fourth signal levels both when the first drive signal changes from the first signal level to the second signal level and when the first drive signal stays at the second signal level from a previous bit.

An optical transmission system that employs a phase coded non-return-to-zero optical transmitter according to embodiments of the present invention is also provided. The optical transmission system additionally includes an optical signal receiver and an optical transmission medium such as a fiber, and more specifically a non-dispersion shifted fiber (NDSF).

BRIEF DESCRIPTION OF THE DRAWINGS

The present invention will be better understood and appreciated more fully from the following detailed description of embodiments of the invention, taken in conjunction with the accompanying drawings of which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that embodiments of the invention may be practiced without these specific details. In other instances, well-known methods and procedures have not been described in detail so as not to obscure the embodiments of the invention.

Some portions of the detailed description in the following are presented in terms of algorithms and symbolic representations of operations on electrical and/or electronic signals, and optical signals. These algorithmic descriptions and representations may be the techniques used by those skilled in the electrical and electronic engineering and optical communication arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or electronic or optical signals capable of being stored, transferred, combined, compared, converted, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

In the following description, various figures, diagrams, flowcharts, models, and descriptions are presented as different means to effectively convey the substances and illustrate different embodiments of the invention that are proposed in this application. It shall be understood by those skilled in the art that they are provided merely as exemplary samples, and shall not be constructed as limitation to the invention.

In optical communications, data transmission uses an optical transmitter connected to an optical receiver by the fiber. Embodiments of the present invention provide a phase coded non-return-to-zero (PC-NRZ) optical signal modulation scheme, and transmitting modules or transmitters for generating such PC-NRZ optical signals, to enhance the quality of high speed optical rate transmission. According to embodiments of the present invention, the proposed optical signal modulation scheme is more immune to or tolerant towards chromatic dispersion than its counterpart with a pure NRZ modulation format.

Figure 1:
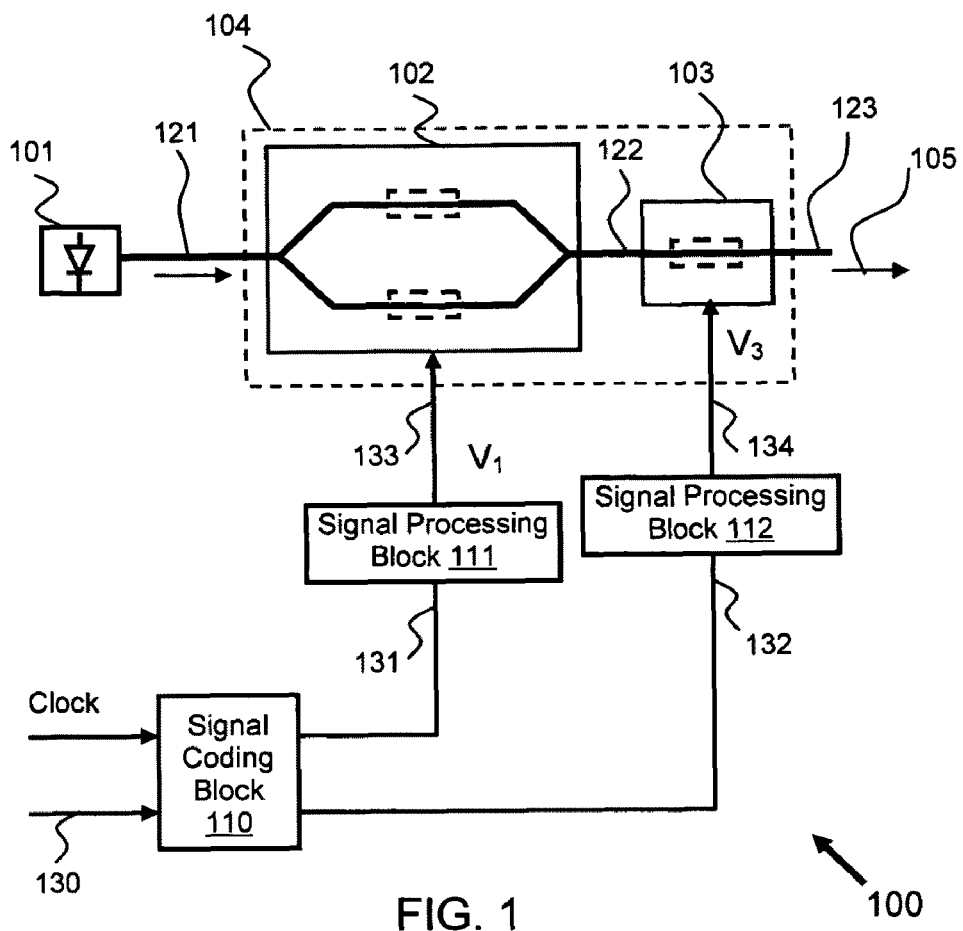
FIG. 1 is a demonstrative block diagram illustration of a phase coded non-return-to-zero optical transmitter according to one embodiment of the present invention.

FIG. 1 is a demonstrative block diagram illustration of a phase coded non-return-to-zero (PC-NRZ) optical transmitter according to one embodiment of the present invention. Transmitter 100, which is a phase coded NRZ optical transmitter, may include a laser diode (LD) 101, an amplitude modulator 102, and a phase modulator 103 connected in a series. For example, laser diode 101 may be connected to amplitude modulator 102 via an optical path 121. Amplitude modulator 102 may be subsequently connected to a phase modulator 103 via an optical path 122. Here, a person skilled in the art will appreciate that the present invention may not be limited in this respect and other connections or configurations may be used as well. For example, LD 101 may be connected first to phase modulator 103 which may then be connected to amplitude modulator 102. As being illustrated in FIG. 1, modulated optical signals coming from phase modulator 103 may be launched into an optical network (not shown) via an optical path 123. Optical paths 121, 122, and/or 123 may be integrated optical waveguide, optical fiber, and/or any other suitable optical transmission media.

According to another embodiment, a single integrated modulator or modulating module may be used to replace both amplitude modulator 102 and phase modulator 103. In other words, amplitude modulator 102 and phase modulator 103 may not necessarily be separate discrete modulators, and an integrated modulator 104, in a single component or a combination of multiple components, may be applied to perform the combined functions of amplitude modulator 102 and phase modulator 103. According to yet another embodiment, transmitter 100 may include multiple phase modulators being connected before and/or after a single amplitude modulator to achieve the function as described below in more details.

Various techniques may be used to create or form optical modulators, as is well known in the art. For example, an amplitude modulator may be formed on a lithium niobate ($LiNbO_3$) substrate. An amplitude modulator formed on a $LiNbO_3$ substrate may include a structure of Mach-Zehnder type that contains two interfering arms or branches, and thus may be known as a M-Z $LiNbO_3$ modulator. Electrical signals, also known as drive signals, may be applied to one or both branches of the amplitude modulator, causing coherent interference between optical signals from the two branches and resulting in amplitude coded optical output signal such as a non-return-to-zero optical output signal. A phase modulator may also be made in a $LiNbO_3$ substrate, and in some cases may be integrated into one of the two branches of the amplitude modulator as described above.

Additionally, an amplitude modulator with a configuration significantly similar to that of the M-Z $LiNbO_3$ modulator may be made on a substrate of III-V elements, such as indium phosphate (InP), with or without the integration of a phase modulator. Further for example, an amplitude modulator may be an electro-absorption modulator (EAM) as is known in the art.

According to embodiments of the present invention, optical transmitter 100 may also include a signal-coding block 110, a first signal-processing block 111, and a second signal-processing block 112. Signal-coding block 110 may receive a digital data signal 130 and a clock signal, depending upon coding schemes of the present invention as described below in more details. Signal-coding block 110 may pass digital data signal 130 as data signal 131 to first signal-processing block 111, and may provide coding or encode digital data signal 130 to create coded signal 132 passing onto second signal-processing block 112. Signal processing blocks 111 and 112 may further process signals 131 and 132, for example, for re-shaping, amplification/attenuation, and adjustment of delays relative to each other to become a first drive signal 133 and a second drive signal 134. First drive signal 133 may be applied to amplitude modulator 102 and second drive signal 134 may be applied to phase modulator 103, to create a phase coded non-return-to-zero (PC-NRZ) optical signal 105. Optical signal 105 may have first and second optical signal levels. First drive signal 133 may have first and second signal levels being adjusted to achieve a predetermined extinction ratio of optical signal 105 between first and second optical signal levels. Second drive signal 134 may have third and fourth signal levels, and may be delay adjusted, such that second optical signal level of optical signal 105 may have a phase change of substantially close to 180 degrees, for example from 160 to 200 degrees, within a single bit at substantially close to half of a bit period, for example, within −10 to 10 percentage from a center of a bit width or bit period.

Figure 2:
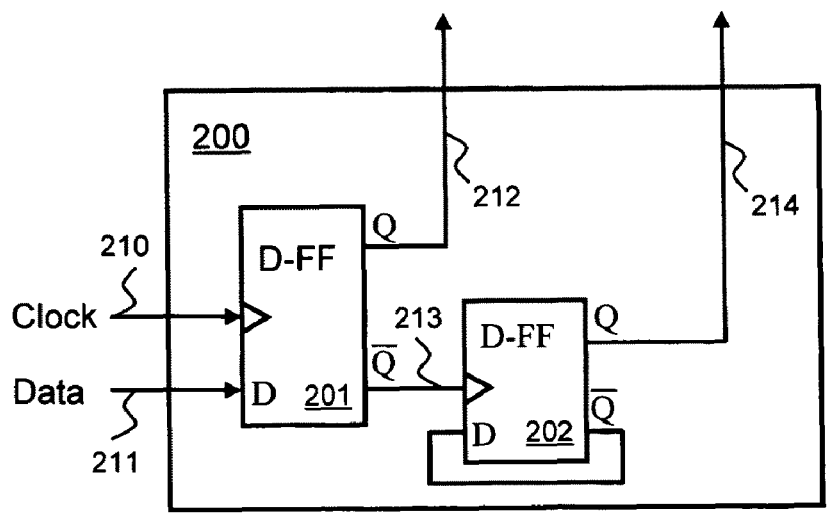
FIG. 2 is an illustrative configuration diagram of a signal-coding block according to one embodiment of the invention.
Figure 5:
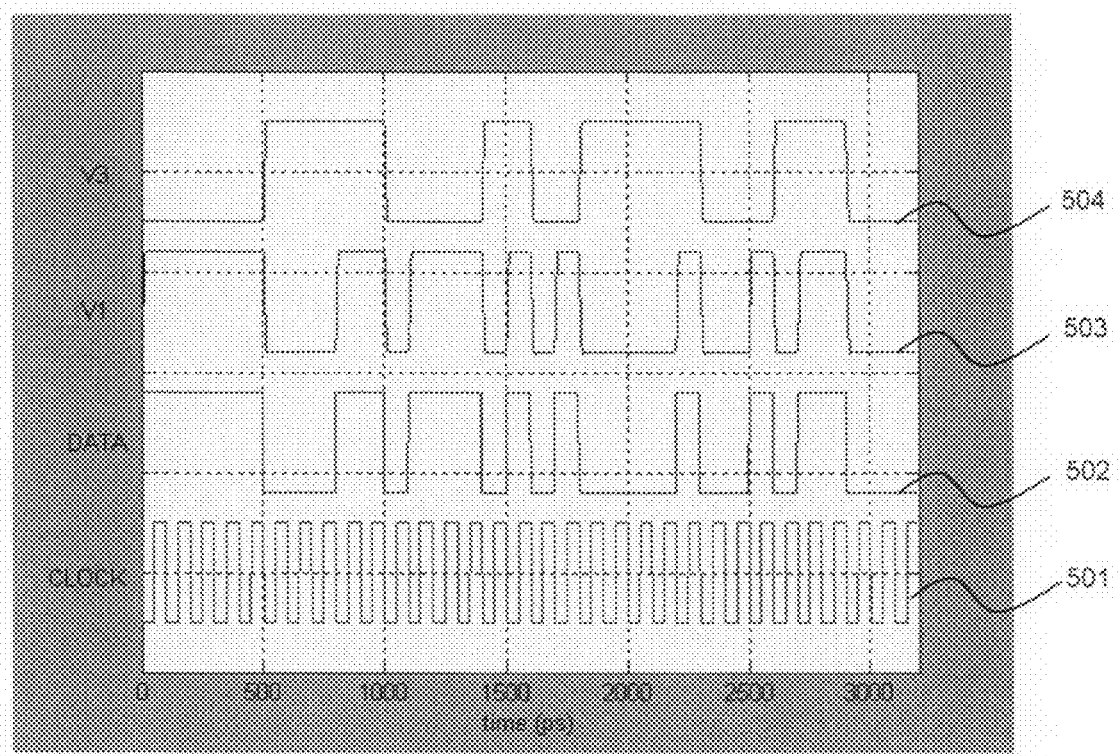
FIG. 5 is a graphical representation of drive signals coded by the signal-coding block illustrated in FIG. 2.

FIG. 2 is an illustrative configuration diagram of a signal-coding block according to one embodiment of the present invention, and FIG. 5 is a graphical representation of drive signals coded by the signal-coding block in FIG. 2. Generally, a string of non-return-to-zero binary digital signal may include two distinctively different signal levels: a "one" or "mark" level representing a digital "1", and a "zero" or "non-mark" level representing a digital "0". According to one embodiment of the present invention, signal-coding block (SCB) 200 may apply an algorithm to create first and second drive signals which, when being applied to modulate amplitude and phase respectively of an input optical signal, may create a modulated optical signal with a predetermined amount of phase change occurring at approximately half of a bit period following a trailing edge of every "one" or "mark" output signal level. The predetermined amount of phase change may be substantially close to 180 degrees, and may be, for example, from 160 degrees to 200 degrees. The changing may occur at substantially close to half of a bit width or bit period, and maybe, for example, within approximately −10 to 10 percentage of a bit period measuring from the center of the bit.

According to one embodiment, SCB 200 may include first and second digital flip-flops 201 and 202. First digital flip-flop (D-FF) 201 may receive an input clock 210 (501 in FIG. 5) and a digital data signal 211 (502 in FIG. 5). D-FF 201 may be triggered by input clock 210 to produce, at its normal output Q, a first output signal 212 (503 in FIG. 5) that may have a same data pattern as digital data signal 211. First output signal 212 may subsequently be processed by signal processing block 111 (FIG. 1) and used as a first drive signal in driving amplitude modulator 102 (FIG. 1). D-FF 201 may also produce, at an inverted output Q, a second output signal 213, which is an inverted version of digital data signal 211 and is fed to second digital flip-flop 202 as a clock.

With an inverted output of second D-FF 202 being connected to a data input port of second D-FF 202, input clock 213 from first D-FF 201 may trigger second D-FF 202 to produce a coded signal 214 (504 in FIG. 5) that is alternated at the rising edge of output signal 213 of first D-FF 201. In other words, output of coded signal 214 is alternated at the falling edge of first output signal 212 (503 in FIG. 5). Coded signal 214 is delivered to signal-processing block 112 for processing, such as re-shaping, amplification/attenuation, and/or delay adjustment, and then applied to phase modulator 103 for phase modulation. The rising or falling edges of coded signal 214, changing from a first signal level to a second signal level or vise versus, may be adjusted to align with a "zero" data bit, at substantially close to half of a bit period following the trailing edge of a "mark" or "one" bit. The adjustment of delay of coded signal 214, relative to first output signal 212, may be achieved inside signal coding block 110 or through signal processing blocks 111 and/or 112.

Figure 3:
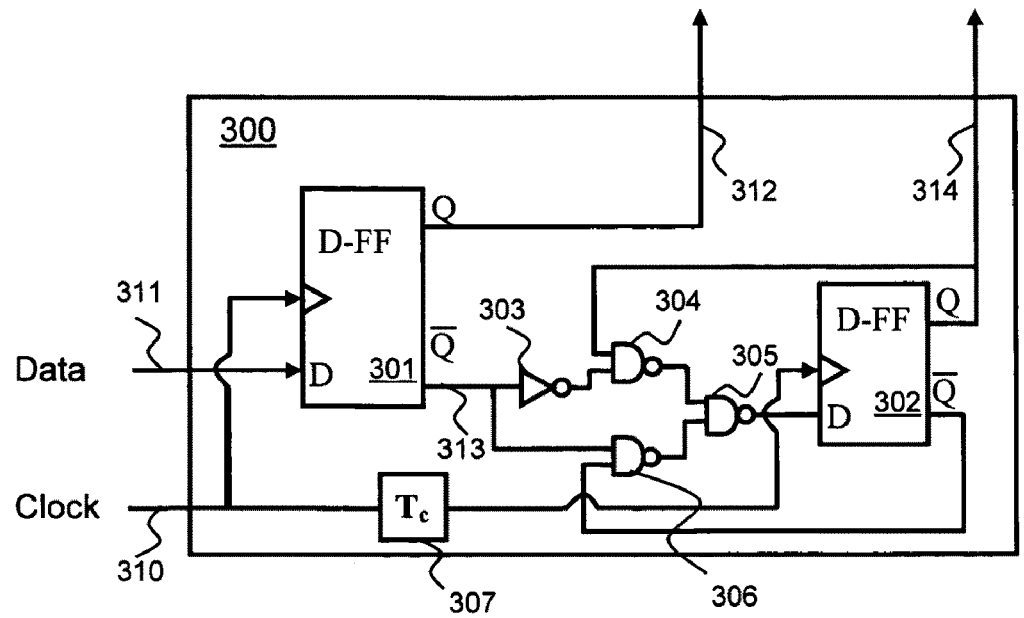
FIG. 3 is an illustrative configuration diagram of a signal-coding block according to another embodiment of the invention.
Figure 6:
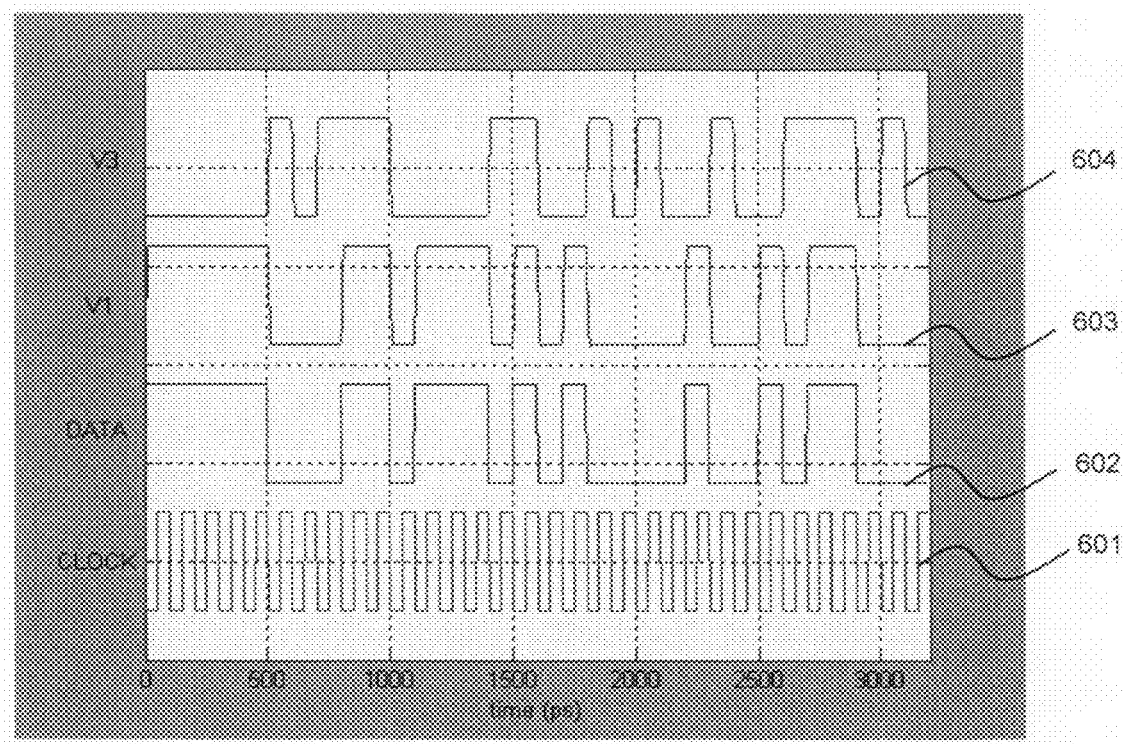
FIG. 6 is a graphical representation of drive signals coded by the signal-coding block illustrated in FIG. 3.

FIG. 3 is an illustrative configuration diagram of a signal-coding block according to another embodiment of the present invention, and FIG. 6 is a graphical representation of drive signals coded by the signal-coding block in FIG. 3. Signal-coding block (SCB) 300 may include first and second digital flip-flops 301 and 302, one digital inverter 303, three NAND logic gates 304, 305, and 306, and one digital delay line 307. Delay line 307 may be used in adjusting a phase relationship between output signals 312 and 314 such that output signal 314 is behind output signal 312 by approximately half of a bit period.

First digital flip-flop (D-FF) 301 may receive an input clock 310 (601 in FIG. 6) and a digital data signal 311 (602 in FIG. 6). D-FF 301 may be triggered by input clock 310 to produce, at its normal output Q, a first output signal 312 (603 in FIG. 6) that may have a same data pattern as digital data signal 311. First output signal 312 may be subsequently processed by signal processing block 111 and used as a first drive signal in driving amplitude modulator 102 (FIG. 1). D-FF 301 may also produce, at its inverted output Q, a second output signal 313, which is an inverted version of digital data signal 311 and is fed to inverter 303 and NAND logic gate 306.

An output from digital inverter 303 may then be fed into an input of NAND logic gate 304, which subsequently provides an output, together with an output from NAND logic gate 306, to input of NAND logic gate 305. An output from NAND logic gate 305 is then applied to a data input port of second D-FF 302. In the configuration, a normal output signal 314 of D-FF 302 is fed into an input of NAND gate 304 and as a second drive signal in driving phase modulator 103, and an inverted output of D-FF 302 is fed into an input of NAND logic gate 306. Under control of a clock signal from digital delay line 307, D-FF 302 generates a coded output 314 (604 in FIG. 6) that toggles or alternates at a falling edge of first output signal 312 when first output signal 312 changes from a first signal level to a second signal level, and when output signal 312 stays at the second signal level from a previous bit.

Figure 4:
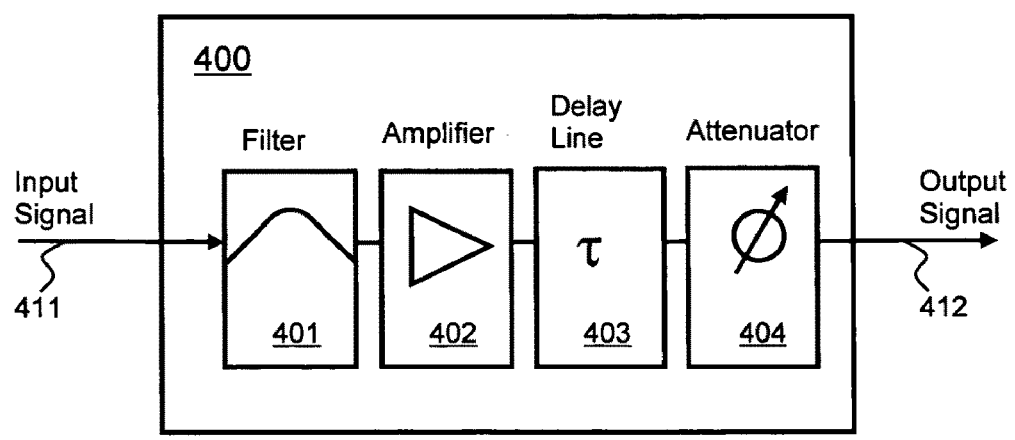
FIG. 4 is an illustrative functional diagram of a signal-processing block according to one embodiment of the invention.

FIG. 4 is a demonstrative block diagram illustration of a signal-processing block used in optical transmitter 100 shown in FIG. 1, according to one embodiment of the invention. Signal-processing block (SPB) 400 may be first signal-processing block 111 and/or second signal-processing block 112. Signal-processing block 400 may include one or more of the following functional blocks such as, for example, a filtering block 401, an amplification block 402, a delay line block 403, and an attenuation block 404. Some of these functional blocks, such as amplification block 402 and attenuation block 404, may be combined as a single block with both amplification and attenuation functions.

Signal-processing block 400 may receive an input electrical signal 411. Filtering block 401 may reshape rising/falling edges of input signal 411. The time delay between V1 (503 in FIG. 5, 603 in FIG. 6) and V3 (504 in FIG. 5, 604 in FIG. 6) may be fixed or adjusted through delay line block 403, in addition to those introduced by signal-coding blocks 200 or 300. The amplitudes of V1 and V3 may also be adjusted through amplification or attenuation function. Extinction ratio of NRZ data may be controlled through V1. The phase shift of optical input signal may be modulated through V3. The drive signals applied to amplitude modulator 102 and phase modulator 103 may be adjusted accordingly through signal process blocks such that an extended transmission distance may be achieved. According to one embodiment, phase modulator 103 may create a phase difference, corresponding to a first and a second signal level of V3, of substantially close to 180 degree in portions of a single bit of output optical signal, particularly at the "zero" or "non-mark" signal level.

Figure 7:
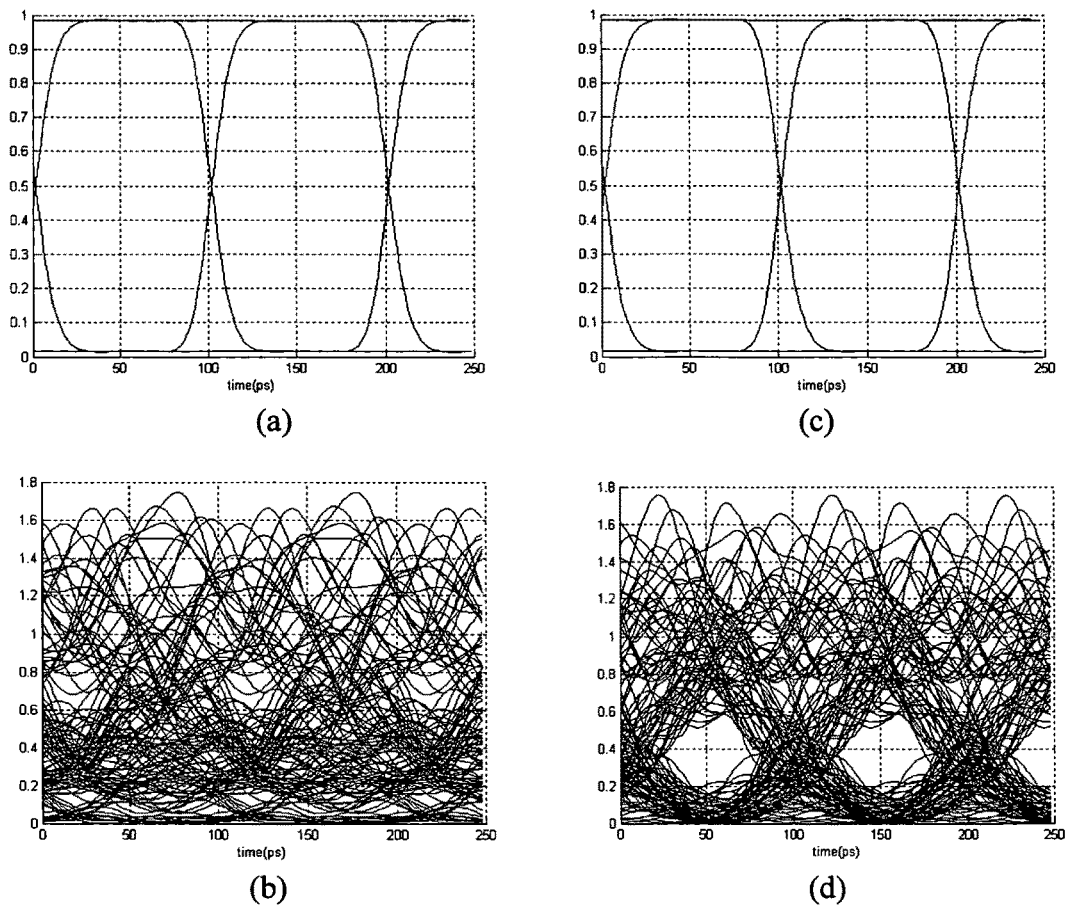
FIGS. 7a-7d are simulated eye diagrams of an optical signal after propagating through 0 and 200 km of conventional fiber, using optical transmitters with and without signal coding according to embodiments of the present invention.

FIG. 7a-7d are simulated eye diagrams of an optical signal after having propagated through 0 and 200 km of a conventional fiber, using optical transmitters without and with phase coding according to embodiments of the present invention. A person skilled in the art will appreciate that there is no significant difference in shapes of eye diagrams or opening of eye diagrams at 0 km without (FIG. 7a) and with (FIG. 7c) phase coding. After propagating through about 200 km of a conventional non-dispersion shifted fiber (NDSF) of, for example, SMF-28 that has about 3500 ps/nm in dispersion at a light wavelength around 1550 nm, based upon simulation, FIG. 7b shows that eye diagram of an optical signal without phase coding has completely closed. On the other hand, eye diagram of a phase coded non-return-to-zero optical signal still has significant eye opening which is clear from simulation shown in FIG. 7d. In other words, phase coding the optical signal according to embodiments of the present invention is an effective way to extend the transmission distance normally limited due to fiber chromatic dispersion.

Figure 8:
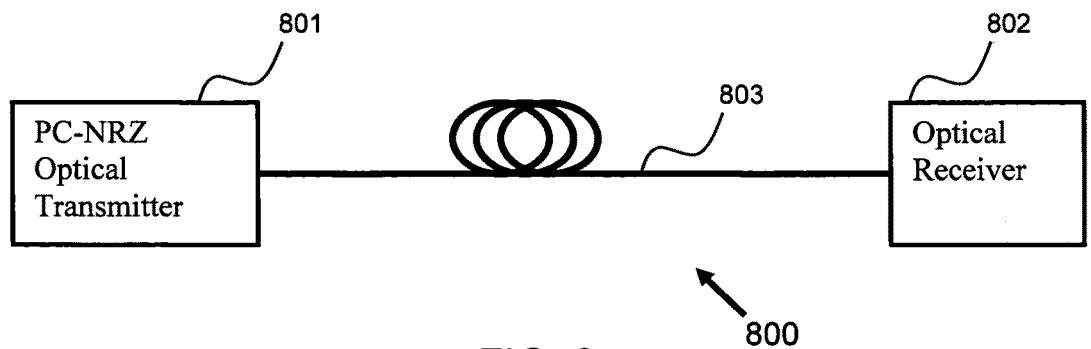
FIG. 8 is a simplified illustration of an optical signal transmission system applying a phase coded non-return-to-zero optical transmitter according to embodiments of the present invention.

FIG. 8 is a demonstrative illustration of an optical transmission system using a phase coded non-return-to-zero optical transmitter according to one embodiment of the present invention. Optical (signal) transmission system 800 may include at least an optical signal transmitter 801, which may be a phase coded non-return-to-zero optical transmitter according to some embodiments of the present invention as described above, an optical signal receiver 802, and an optical transmission medium 803 connecting optical transmitter 801 and optical receiver 802. Optical transmission medium 803 may be a fiber and, according to one embodiment, may be a non-dispersion shifted fiber (NDSF) of several hundred kilometers long. For example, optical transmission medium 803 may be a 200-km long NDSF fiber with a total dispersion of up to 3500 ps/nm at a wavelength around 1550 nm. A phase coded non-return-to-zero optical signal launched by optical transmitter 801 may propagate through transmission medium of fiber 803 and reach optical receiver 802 with significant opening still in the received eye diagram, as being illustrated in FIG. 7d above.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A method for producing a phase coded non-return-to-zero (PC-NRZ) optical signal, the method comprising:
  providing an input optical signal;
  providing first and second drive signals, said first drive signal having a first data pattern of first and second signal levels, said second drive signal having a second data pattern, said second data pattern having third and fourth signal levels that toggle at least when said first drive signal changes from said first signal level to said second signal level; and modulating amplitude of said input optical signal with said first drive signal and modulating phase of said input optical signal with said second drive signal to produce said PC-NRZ optical signal, wherein said providing first and second drive signals comprises:

applying a digital data signal to a data input port of a first digital flip-flop and thus producing said first drive signal at a normal output port of said first digital flip-flop; and applying an inverted output from said first digital flip-flop to a clock input port of a second digital flip-flop and thus producing said second drive signal at a normal output port of said second digital flip-flop, wherein an inverted output port of said second digital flip-flop is connected to a data input port of said second digital flip-flop.

2. The method of claim 1, wherein said first and second data patterns have a predetermined bit period, further comprising:

causing a delay between said first and second drive signals, before being applied in modulating said amplitude and phase of said input optical signal, such that said toggling between said third and fourth signal levels of said second drive signal happens at a time substantially close to half of said bit period behind corresponding said change of said first drive signal from said first signal level to said second signal level.

3. The method of claim 2, further comprising adjusting said third and fourth signal levels of said second drive signal and thus creating a phase difference of substantially close to 180 degrees in portions of a single bit, of said PC-NRZ optical signal, relating to modulations caused by said third and fourth signal levels of said second drive signal.

4. The method of claim 3, wherein said PC-NRZ optical signal has first and second optical signal levels, further comprising adjusting said first and second signal levels of said first drive signal and thus achieving a predetermined extinction ratio between said first and second optical signal levels, wherein said second optical signal level corresponds to said second signal level of said first drive signal, and is smaller than said first optical signal level.

5. The method of claim 4, wherein achieving said predetermined extinction ratio comprises reshaping said first and second drive signals before applying said first and second drive signals in modulating said amplitude and phase of said input optical signal.

6. An optical transmitter comprising:

an optical signal source;

a modulation module connected to said optical signal source, said modulation module including at least an amplitude modulator and a phase modulator being applied to an input optical signal coming from said optical signal source; and an electrical circuit having first and second electrical connections to said amplitude modulator and said phase modulator, respectively, of said modulation module, said first electrical connection providing a first drive signal that has a first data pattern of first and second signal levels, said second electrical connection providing a second drive signal that has a second data pattern, said second data pattern having third and fourth signal levels that toggle at least when said first drive signal changes from said first signal level to said second signal level, wherein said electrical circuit comprises a signal coding block, said signal coding block having first and second digital flip-flops; said first digital flip-flop having an inverted output connected to an inverter and a first NAND logic gate; an output from said inverter being connected to a second NAND logic gate; outputs from said first and second NAND logic gates being connected to a third NAND logic gate; an output from said third NAND logic gate being connected to an data input of said second digital flip-flop; and an inverted output of said second digital flip-flop is connected to said first NAND logic gate.

7. The optical transmitter of claim 6, wherein said first and second data patterns having a predetermined bit period, and wherein said electrical circuit is adapted to delay said second drive signal relative to said first drive signal such that said toggling between said third and fourth signal levels of said second drive signal occurs at a time substantially close to half of said bit period behind corresponding said change of said first drive signal from said first signal level to said second signal level.

8. The optical transmitter of claim 7, wherein said third and fourth signal levels of said second drive signal of said electrical circuit modulates a phase of said input optical signal to produce a phase coded optical signal, said phase coded optical signal having a phase difference of substantially close to 180 degrees in portions of a single bit corresponding to said third and fourth signal levels of said second drive signal.

9. The optical transmitter of claim 6, wherein said electrical circuit comprises a signal delay element being adapted to adjust delays of said second drive signal relative to said first drive signal such that said toggling between said third and fourth signal levels of said second drive signal happens at a time substantially close to half of a bit period behind corresponding said change of said first drive signal from said first signal level to said second signal level.

10. The optical transmitter of claim 6, wherein said electric circuit is adapted to provide said second drive signal, output of said second drive signal toggles between said third and fourth signal levels both when said first drive signal changes from said first signal level to said second signal level and when said first drive signal stays at said second signal level from a previous bit.

11. An optical transmission system, comprising:

an optical transmitter being adapted to transmit a phase coded optical signal, said optical transmitter comprises:

an optical signal source;

a modulation module connected to said optical signal source, said modulation module including at least an amplitude modulator and a phase modulator being applied to an input optical signal coming from said optical signal source; and an electrical circuit having first and second electrical connections to said amplitude modulator and said phase modulator, respectively, of said modulation module, said first electrical connection providing a first drive signal that has a first data pattern of first and second signal levels, said second electrical connection providing a second drive signal that has a second data pattern, said second data pattern having third and fourth signal levels that toggle at least when said first drive signal changes from said first signal level to said second signal level, wherein said electrical circuit comprises a signal coding block, said signal coding block having first and second digital flip-flops, said first digital flip-flop having an inverted output connected to a clock input of said second digital flip-flop, respective normal outputs of said first and second digital flip-flops produce said first and second drive signals;

an optical transmission medium; and an optical receiver being adapted to receive said phase coded optical signal, via said optical transmission medium, and recover a data signal from said phase coded optical signal, wherein said phase coded optical signal has first and second optical signal levels, said second optical signal level being smaller than said first optical signal level, said second signal level having a phase change of substantially close to 180 degrees within a single bit at substantially close to half of a bit period.

12. The optical transmission system of claim 11, wherein said phase coded optical signal has phase changes both when said phase coded optical signal changes from said first optical signal level to said second optical signal level and when said phase coded optical signal stays at said second optical signal level from a previous bit.

* * * * *